Jan. 4, 1949.  K. W. COUSE  2,458,255
RELEASING MECHANISM FOR POWER TAKE-OFFS
Filed July 4, 1945  4 Sheets-Sheet 1
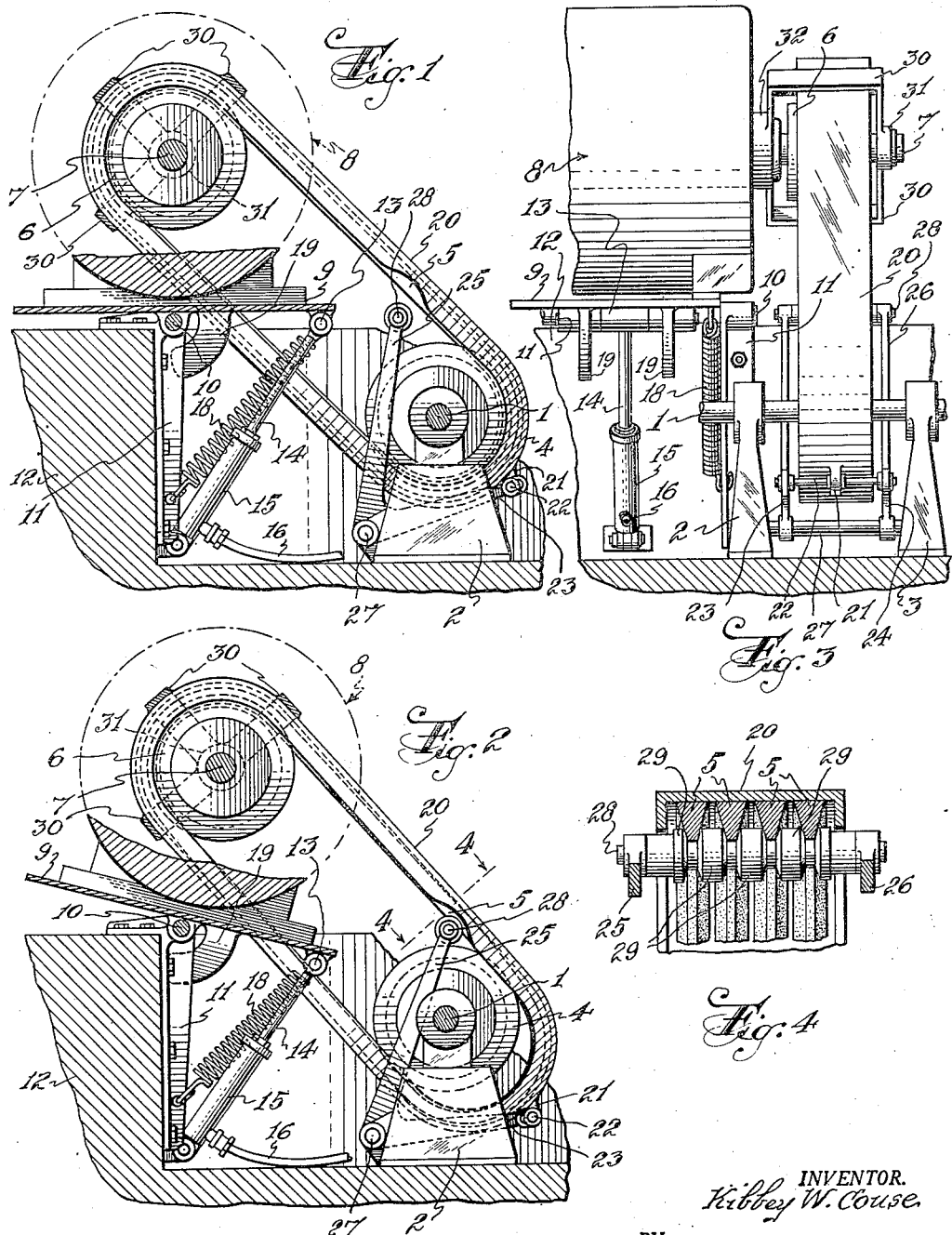
INVENTOR.
Kibbey W. Couse
BY
A. D. T. Libby
Attorney.

Jan. 4, 1949.  K. W. COUSE  2,458,255
RELEASING MECHANISM FOR POWER TAKE-OFFS
Filed July 4, 1945  4 Sheets-Sheet 2
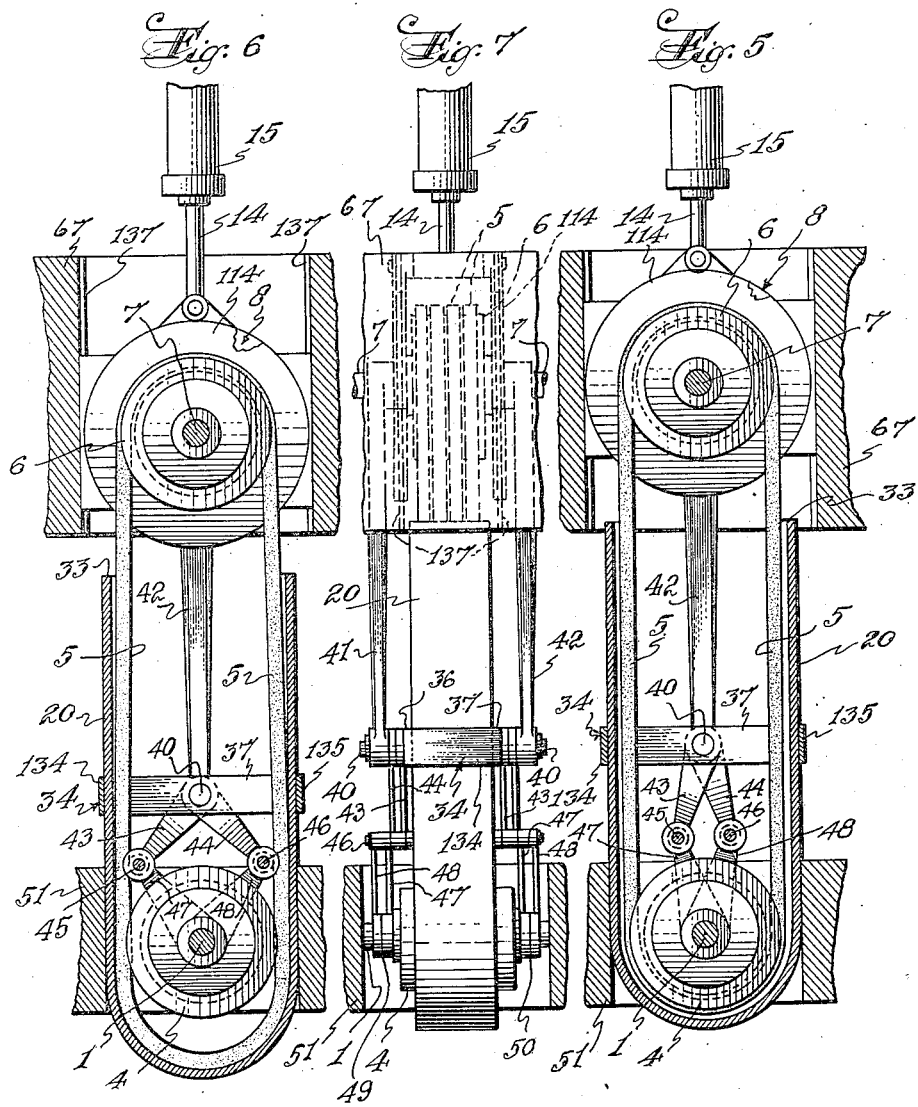

Jan. 4, 1949. K. W. COUSE 2,458,255
RELEASING MECHANISM FOR POWER TAKE-OFFS
Filed July 4, 1945 4 Sheets-Sheet 3
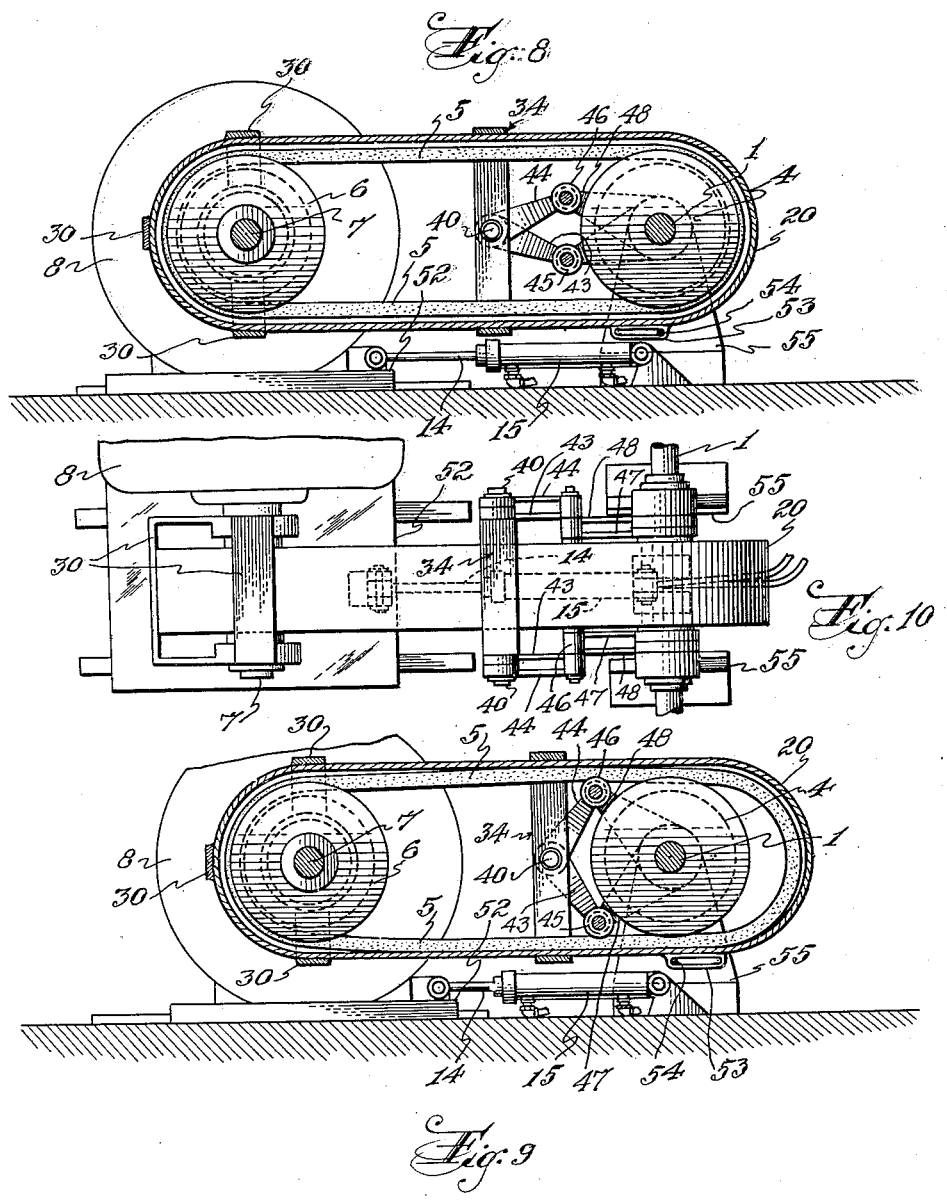
INVENTOR.
Kibbey W. Couse
BY A. D. T. Libby
Attorney.

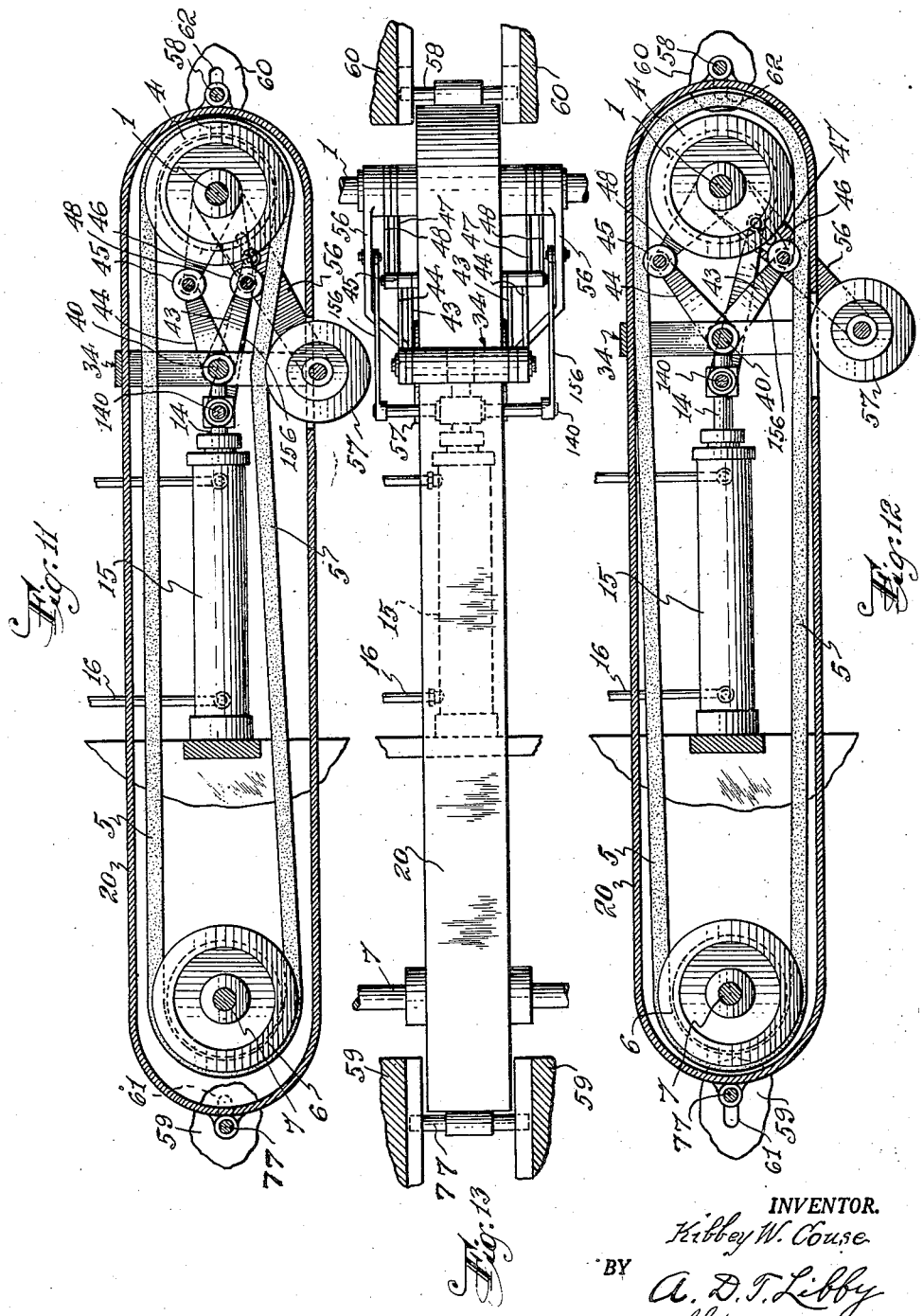

UNITED STATES PATENT OFFICE 2,458,255

RELEASING MECHANISM FOR POWER TAKE-OFFS

Kibbey W. Couse, Newark, N. J.

Application July 4, 1945, Serial No. 603,139

8 Claims. (Cl. 74—242.8)

1

This invention relates to a special type of power take-off structure in which special means are provided for releasing the driving connection between a driving and a driven shaft, or for changing the driving characteristics from the driving shaft to the driven shaft.

My present invention is especially adapted for use in connection with the V belting where the space is limited or more or less confined and where normal clutching is disadvantageous. It is therefore the object of my invention to provide means for releasing or altering the driving characteristics from a driving shaft and its pulley to a structure having a shaft to be driven, through the medium of a pulley thereon and belts inter-connecting the pulleys, so that the gripping of the belts may be released or changed so that little or no power is conveyed from the driving pulley to the driven pulley.

My invention will be readily understood by reference to the annexed drawings which are schematic to illustrate the principles involved. In the drawings Figure 1 is mostly a side elevational view of one form of the structure hereinafter described in detail.

Figure 2 is a view similar to Figure 1 but with the driving belt moved to idle position.

Figure 3 is a view of Figure 1 looking from right to left.

Figure 4 is a fragmentary view on the line 4—4 of Figure 2.

Figure 5 is a view of a modified form of construction with the parts in driving or power transmitting position, all of the parts being shown for vertical operation some in elevation and some in section.

Figure 6 is a view similar to Figure 5 but with the structure in position of zero power transmission.

Figure 7 is a side view of Figure 5.

Figure 8 shows a further modified form of construction which is somewhat similar to Figure 5 but with the parts in horizontal position and the parts in power transmitting position.

Figure 9 is a view of Figure 8 but with the parts in zero power transmitting position.

Figure 10 is a plan view looking down on the top of Figure 8.

Figure 11 is a view somewhat like Figure 8 and with the parts in power transmitting position.

Figure 12 is a view similar to Figure 11 but with the parts in zero power transmitting position.

Figure 13 is a plan view of Figure 11.

Referring now to the details wherein like numbers refer to corresponding parts in the various views, 1 is a driving shaft which is operated by any suitable source of power. The shaft 1 is supported by bearing pedestals 2 and 3 and carries a pulley 4 which is adapted to receive and drive a set of V belts 5 which pass over a pulley 6 carried on a shaft 7 which may be a shaft of some unit 8 that is adapted to be driven. As illustrated, unit 8 may be an electrical generator. Unit 8 is mounted on a base 9 that is pivoted at 10 to a fixture 11 fastened to a support 12. The base 9 has fastened thereto by a pivot pin 13, a piston 14 of an actuating device 15 which may be hydraulic or a compressed air cylinder which is operated through the medium of a pipe 16. Also fastened to the base 9 or adjacent the pivot 13 is a spring 18 the opposite end of which is fastened to the fixture 11. This spring is utilized as a counterbalance. The base 9 is provided with stop arms 19 which are adapted to engage with the support 12 to limit the tilting movement of the base 9. The stop arms 19 can also react to support the weight of the unit 8 in an emergency, should something go wrong with the actuating device 15. Positioned over the belts 5 is a guard member 20. The end of the guard which passes around the driving pulley 4 has a lug 21 fixed thereto. The rod 22 passes through the lug 21 and is engaged at its opposite ends by arms 23 and 24 forming part of a bell crank structure the other arms of which are 25 and 26. The bell crank structure being pivoted on a rod 27 which may be carried by some part of the support 12 or projection on the pedestals 2 and 3. The arms 25 and 26 carry a shaft 28 on which is rotatably mounted rollers 29 formed and positioned to receive the V belts 5.

The opposite end of the guard 20 is supported by braces 30 that are carried by sleeves 31 and 32 which are supported loosely on the unit 8. From the foregoing description of the details it will be readily understood that when piston 14 is operated through the medium of the pipe 16 the base 9 with the unit thereon will be tilted so that the axis of shaft 7 approaches the axis of the shaft 1 and the guard 20 will be moved to the position shown in Figure 2. This action will cause the bell crank structure to move about the pivot 27 to cause the rollers 29 to engage the V belts 5 as indicated in Figure 4 and will lift them from out of power driving contact with the pulley 4. When it is desired to transmit power from the pulley 4 to the pulley 6 the piston 14 is operated by way of the pipe 16 to move the parts back to the position shown in Figure 1 which is the normal power driving position.

In Figure 5 the driving shaft 1 and its pulley 4 are fixed as in Figures 1 and 2 but the shield 20 does not extend over the driven pulley 6 but only to some point 33. However, in this case the two parts of the shield 20 are fastened together by a rectangular shaped tie band 34 having top and bottom cross members 134 and 135 and end members 36 and 37 between which a pivot pin 40 is fastened or stud pins may be welded direct to the end members 36 and 37. On the opposite ends of the pin 40 are mounted two rigid arms 41 and 42 which extend from the support 67 carrying unit 8, which in this case may have slide rails 114 running in guide ways 137. Also pivoted on the pin 40 are toggle arms 43 and 44 which are pivoted along with rollers 45 and 46, similar to rollers 29 in Figure 4, to toggle arms 47 and 48 that are rotatably carried on bushings 49 and 50 supported by the driving pulley mechanism. When power is applied to the unit 8 through the actuating device 15 the unit 8 is moved toward the fixed driving pulley 4, and by reason of the structure described, the shield 20 slides in the support 51 and the rollers 45 and 46 will engage the V belts 5 and push them out of power driving engagement to the pulley 4 as illustrated in Figure 6.

In Figures 8, 9 and 10 the construction is similar to that shown in Figures 5, 6 and 7 but the unit 8 is moved in a horizontal direction along with its support 52. However, in this form a slotted lug 53 is fastened to the shield 20 and a pin 54 fastened to the support 55 positioned in the slot 53 so as to limit the movement of the guard 20 and its associated parts.

In the modifications shown in Figures 11, 12 and 13 the unit 8 with its shaft 7 and pulley 6 is held in fixed position as is the driving shaft 1 and its pulley 4 but in this modification the operating device 15 is connected directly to the belt guard tie band which has the same arrangement of toggle arms and rollers as in Figures 5 and 8; however, the plunger 14 is connected to a cross rod 140 to which is pivoted arms 156 that are linked to arms 56 supported around the shaft 1 but independent thereof. The arms 56 carry an idle roller 57 so that when the device 15 is in the position shown in Figure 11 the idle roller 57 engages the belts 5 to move them into the power driving position as shown in Figure 11 but when the device 15 is energized the parts are moved as shown in Figure 12 wherein roller 57 is moved to idle position and likewise the belts 5. In this form the guard is movably supported at one end by a lug and pin 77, the latter going into a fixed member 59 having a slot or guide way 61 therein. At the opposite end the guard is held by a lug and pin 58, the latter going into a slot or guide way 62 in a support 60.

From the foregoing description it will be understood that various changes may be made in the details, without departing from the spirit of my invention or the scope of the appended claims.

What I claim is:

1. A releasing mechanism for a power take-off including driving and driven pulleys with supports therefor and belt means for running over the pulleys, a guard outside the belt, means for shifting the guard longitudinally of its length and means connected to the guard for acting on the belt without shifting the position of the driving pulley for changing the tension of the belt means between the said pulleys.

2. A releasing mechanism for a power take-off including driving and driven pulleys with supports therefor and belt means for running over the pulleys, a guard outside the belt, means for shifting the guard longitudinally of its length and means cooperatively connected with the guard brought into action by shifting the guard for engaging said belt means without shifting the position of the driving pulley to change its driving characteristics from the driving to the driven pulley.

3. A releasing mechanism for a power take-off including a driving pulley, a driven pulley carried on a shaft of a unit to be driven, said unit being mounted on a support capable of being shifted in a direction such that the axis of the shaft of the unit may be moved toward or away from the axis of the driving pulley with means for shifting said support, belt means connecting said pulleys, a guard outside the belt and mounted so as to be simultaneously shifted with said shaft and means operatively connected with the guard independent of the driving pulley for engaging said belt means to change its driving characteristics from the driving to the driven pulley.

4. A mechanism as set forth in claim 3 further characterized in that the said unit support is tiltable to produce the required shifting of said shaft axis and further defined in that means are provided for limiting the amount of tilt.

5. A mechanism as set forth in claim 3 further characterized in that the said unit support is slidably mounted so its movement can be in a straight direction to produce the required shifting of said shaft axis.

6. A releasing mechanism for a power take-off including driving and driven pulleys with supports therefor and belt means for running over the pulleys, a guard outside the belt, means for shifting the guard longitudinally of its length and means comprising a pivoted bell crank lever device having one arm of the lever device pivoted to the end of the guard outside the driving pulley and the other arm of the lever device provided with rotatable means for engaging said belt means to change its driving characteristics.

7. A mechanism as set forth in claim 1 further characterized in that said means for shifting the guard comprises a cross member extending between and fastened to opposite parts of the guard and a toggle structure having a pair of arms pivoted to said cross member and another pair of arms pivoted to supports carrying said driving pulleys, said pairs of arms extending toward each other are being joined by a union carrying rotatable means which is adapted to act on said belt means as the guard is moved substantially as described.

8. A mechanism as set forth in claim 1 further characterized in that said means for shifting the guard comprises a cross member extending between and fastened to opposite parts of the guard and a double toggle structure actuated by said guard when it is moved for acting on said belt means to change its driving contact with the driving pulley.

KIBBEY W. COUSE.

REFERENCES CITED

The following references are of record in the file of this patent:

UNITED STATES PATENTS

| Number | Name | Date |
| --- | --- | --- |
| 372,056 | Baker | Oct. 25, 1887 |
| 1,296,259 | Bliss | Mar. 4, 1919 |
| 2,047,362 | Dunford | July 14, 1936 |
| 2,156,701 | Petersen | May 2, 1939 |
| 2,210,135 | Tautz et al. | Aug. 6, 1940 |